(12) United States Patent
Jordan

(10) Patent No.: US 6,896,506 B1
(45) Date of Patent: May 24, 2005

(54) METHOD AND APPARATUS FOR SCRAPLESS THERMOFORMING

(75) Inventor: Alan Jordan, Fitchburg, WI (US)

(73) Assignee: Coextruded Plastic Technologies, Inc., Edgerton, WI (US)

( * ) Notice: Subject to any disclaimer, the term of this patent is extended or adjusted under 35 U.S.C. 154(b) by 92 days.

(21) Appl. No.: 10/234,278

(22) Filed: Sep. 4, 2002

(51) Int. Cl.[7] .............................................. B29C 51/08
(52) U.S. Cl. ..................... 425/384; 425/388; 425/394; 425/403.1; 425/DIG. 48
(58) Field of Search ................................ 425/384, 388, 425/394, 412, 403.1, 407, DIG. 48

(56) References Cited

U.S. PATENT DOCUMENTS

| | | | | |
|---|---|---|---|---|
| 3,669,594 A | * | 6/1972 | Brown et al. ............... | 425/397 |
| 3,947,204 A | | 3/1976 | Ayres et al. ................ | 425/383 |
| 3,964,237 A | | 6/1976 | Johansen ..................... | 53/141 |
| 4,005,967 A | * | 2/1977 | Ayres et al. ................ | 425/384 |
| 4,048,781 A | | 9/1977 | Johansen ...................... | 53/30 |
| 4,088,526 A | | 5/1978 | Amberg et al. ............. | 156/446 |
| 4,120,932 A | | 10/1978 | Roth .......................... | 264/292 |
| 4,133,625 A | | 1/1979 | Kellermann et al. ........ | 425/394 |
| 4,150,936 A | | 4/1979 | Shioi et al. ................. | 425/397 |
| 4,234,530 A | | 11/1980 | Thiel et al. ................. | 264/151 |
| 4,563,325 A | * | 1/1986 | Coffman ................... | 425/387.1 |
| 4,836,764 A | | 6/1989 | Parkinson ................... | 425/384 |
| 4,883,633 A | | 11/1989 | French ....................... | 264/550 |
| 4,892,604 A | | 1/1990 | Measells et al. ......... | 156/244.24 |
| 4,915,230 A | | 4/1990 | Mancini ..................... | 206/459 |
| 4,997,691 A | | 3/1991 | Parkinson .................. | 428/35.7 |
| 5,091,231 A | | 2/1992 | Parkinson .................. | 428/36.6 |
| 5,798,079 A | | 8/1998 | Freek et al. ................ | 264/554 |
| 5,863,568 A | | 1/1999 | Tomita et al. .............. | 425/185 |
| 5,935,511 A | | 8/1999 | Brown ........................ | 264/551 |
| 5,996,837 A | | 12/1999 | Freek et al. ................. | 220/713 |
| 6,094,890 A | | 8/2000 | Michellon et al. ............ | 53/453 |
| 6,202,998 B1 | | 3/2001 | Gupte ......................... | 269/239 |
| 6,336,805 B1 | | 1/2002 | Padovani ................. | 425/403.1 |

FOREIGN PATENT DOCUMENTS

| | | | |
|---|---|---|---|
| CA | 2318933 | | 7/1999 |
| EP | 666 794 | | 1/1997 |
| EP | 972 627 | | 1/2000 |
| EP | 995 700 | | 4/2000 |
| JP | 57-027723 | * | 2/1982 |
| JP | 58-140207 | | 8/1983 |
| TW | 436406 | | 5/2001 |
| WO | 95/33617 | | 12/1995 |
| WO | 99/37465 | | 7/1999 |
| WO | 01/60587 | | 8/2001 |

OTHER PUBLICATIONS

Wonderpack Industries, "Disk Fed Thermoforming Machine", http://www.wonderpackindustries.com/pages/epf1.htm (1 page), undated, printed May 31, 2002.

Hassia USA—Products, http://www.hassiausa.com/products/ (1 page), undated, printed May 31, 2002.

(Continued)

*Primary Examiner*—James P. Mackey
*Assistant Examiner*—Thu Khanh T. Nguyen
(74) *Attorney, Agent, or Firm*—Foley & Lardner LLP

(57) ABSTRACT

A thermoforming machine includes a loading station configured to load a thermoplastic billet onto a frame. The frame has an outer ring and a billet support blade defining a channel therebetween. The billet support blade engages the billet to maintain the billet on the frame during heating of the billet. A heating apparatus is configured to heat the billet and a forming station is configured to form the billet into a container.

16 Claims, 4 Drawing Sheets

OTHER PUBLICATIONS

Eval Company of America, Technical Bulletin No. 150, Thermoforming of Eval™ Resin Containing Structures, (11 pages), marked "REV. 07-00.".

Coralfoam, Articulated cavity process enables preforms to be blow molded or vacuum formed during the injection machine's mold open stroke, (2 pages), undated.

* cited by examiner

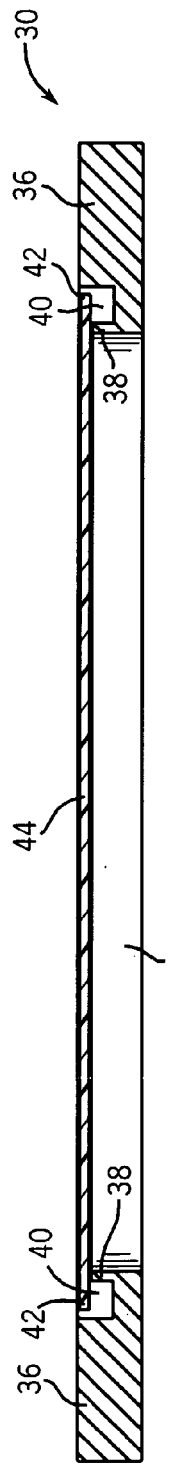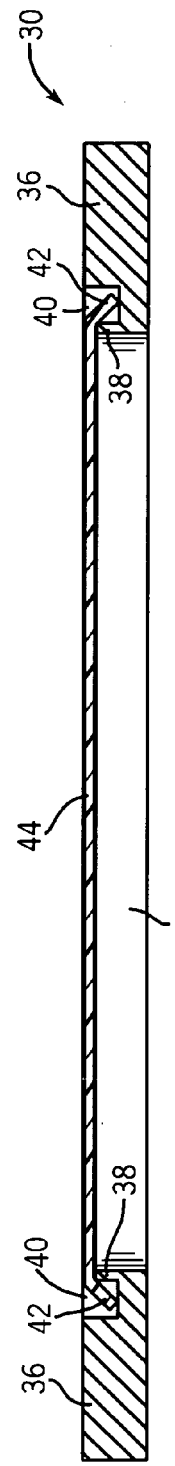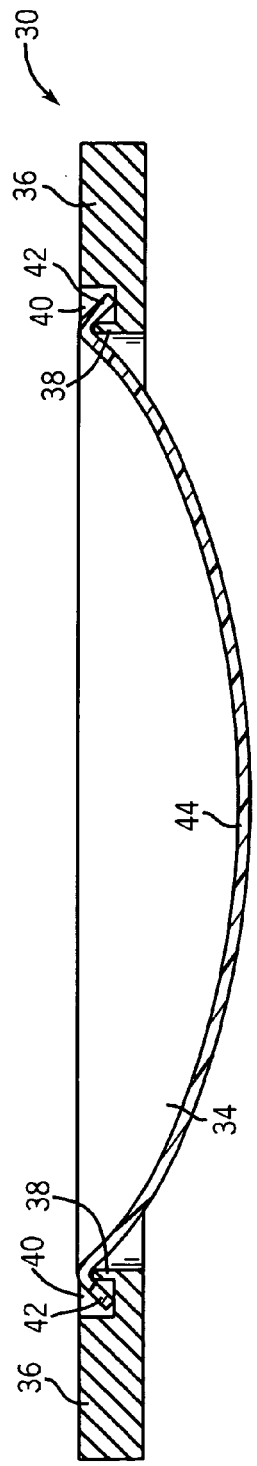

METHOD AND APPARATUS FOR SCRAPLESS THERMOFORMING

FIELD OF THE INVENTION

The present invention relates to a scrapless thermoforming process and associated apparatus. In particular, the present invention relates to a frame for transporting a billet in a thermoforming machine.

BACKGROUND OF THE INVENTION

A thermoformer or thermoforming machine typically has a series of stages that transform input plastic material into finished containers. The input material is a thermoplastic substance that can be formed when heated. A common thermoplastic material is polypropylene. The finished containers are commonly used to hold food or beverages, and may be formed into a variety of sizes and shapes depending on the thermoforming process that is utilized.

Thermoplastic materials may be fed into a thermoforming machine in the form of a continuous sheet or as individually cut blanks or billets. When the input materials are individual thermoplastic billets, the process is called "scrapless thermoforming" because the finished containers need not be cut from the sheet after forming, reducing the amount of scrap material. In scrapless thermoforming, a billet feeding unit is typically used to load individual billets onto a conveying device in the machine.

Prior to being formed into containers, the billets must be heated to the desired temperature. The desired temperature depends on the structure of the machine being used as well as the desired properties of the end product. For example, containers may be formed while the thermoplastic material is below the crystalline melt point of the material. Such forming is known as solid-phase pressure forming. Other methods involve heating the material to its melting point prior to forming. Such a process is known as melt-phase thermoforming.

A conventional scrapless thermoforming machine has several stages used to create formed containers. First, the billets are loaded into the machine. Second, an oven is used to heat the billets to the desired temperature. Third, a form station or form press utilizes a hydraulic press or other suitable means to form the individual containers. After exiting the form press, the formed containers are removed from the machine at an unloading station. Other stations may be added to the thermoforming machine as desired, such as a pre-heating oven and a coining press to form an initial container edge prior to entry into the main oven. A conveyor is typically used to transport the billets through the various stations.

Whether the containers are formed utilizing solid-phase forming or melt-phase forming, a problem that must be addressed involves the deformation of the thermoplastic material as it is heated. Because the billets are typically supported in a horizontal fashion with only peripheral supports beneath each billet due to the configuration of the form press, the billets tend to sag or droop between the supports when heated. In some cases, the billets may entirely fall out of their supports when heated due to the material deformation.

The thermoforming art has tried many methods of preventing material deformation from adversely impacting the thermoforming process. One method involves minimizing the size of the billets. This method prevents the formation of larger containers. Another method is to utilize round billets such that the resultant uniform deformation allows the support to retain the billet during heating. This method precludes the forming of containers having a non-uniform cross-section, such as rectangular or oval containers. Yet another method of addressing the deformation issue is to utilize a ring placed on top of the billet to strengthen the frictional grip on the billet during heating. This method presents additional manufacturing challenges with respect to how to efficiently place individual rings on top of each billet during the loading process.

Accordingly, there is a need for a thermoforming machine that addresses the problem of billet deformation. Further, it would be advantageous to have a solution for the billet deformation problem that permits the formation of larger sized containers or containers having non-uniform shapes. Further still, it would be advantageous to address the problem of billet deformation without adversely impacting the efficiency of the overall processor requiring additional equipment and components.

It would be desirable to provide a system and/or method that provides one or more of these or other advantageous features. Other features and advantages will be made apparent from the present specification. The teachings disclosed extend to those embodiments that fall within the scope of the appended claims, regardless of whether they accomplish one or more of the aforementioned needs.

SUMMARY OF THE INVENTION

The invention relates to a thermoforming machine having a loading station configured to load a thermoplastic billet onto a frame having an outer ring and a billet support blade defining a channel therebetween. The billet support blade engages the billet to maintain the billet on the frame during heating of the billet. A heating apparatus is configured to heat the billet and a forming station is configured to form the billet onto a container.

The invention further relates to a frame for transporting a billet in a thermoformer. The frame includes an outer ring defining a center cavity and a blade extending around the center cavity inside of the outer ring, defining a channel extending between the blade and the outer ring. The blade is configured to support a thermoplastic billet, and the channel is of sufficient width to receive a portion of the thermoplastic billet.

The invention still further relates to a method of forming a container from a plastic billet. The method includes the steps of loading the billet onto a frame having a perimeter, the frame having a blade for supporting the billet, the blade comprising a thin wall of material disposed interior of the frame perimeter, defining a channel between the blade and the perimeter. The method further includes the step of heating the billet to a temperature suitable for thermoforming and forming a container from the billet.

The invention still further relates to a thermoforming machine having a loading station configured to load a plastic billet onto a conveying mechanism, the conveying mechanism having a frame with an outer ring and a billet support, the billet support having means for frictionally gripping the billet, the billet forming an arch over the gripping means when heated. The thermoforming machine further includes a heating apparatus configured to heat the billet and a forming station configured to form the billet into a container.

The invention is capable of other embodiments and of being practiced or being carried out in various ways. Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 3 is a sectional view of a frame having a billet disposed therein;

FIG. 4 is a sectional view of a frame having a coined billet disposed therein;

FIG. 5 is a sectional view of a frame having a heated billet disposed therein.

DESCRIPTION OF PREFERRED EMBODIMENTS

Figure 1:
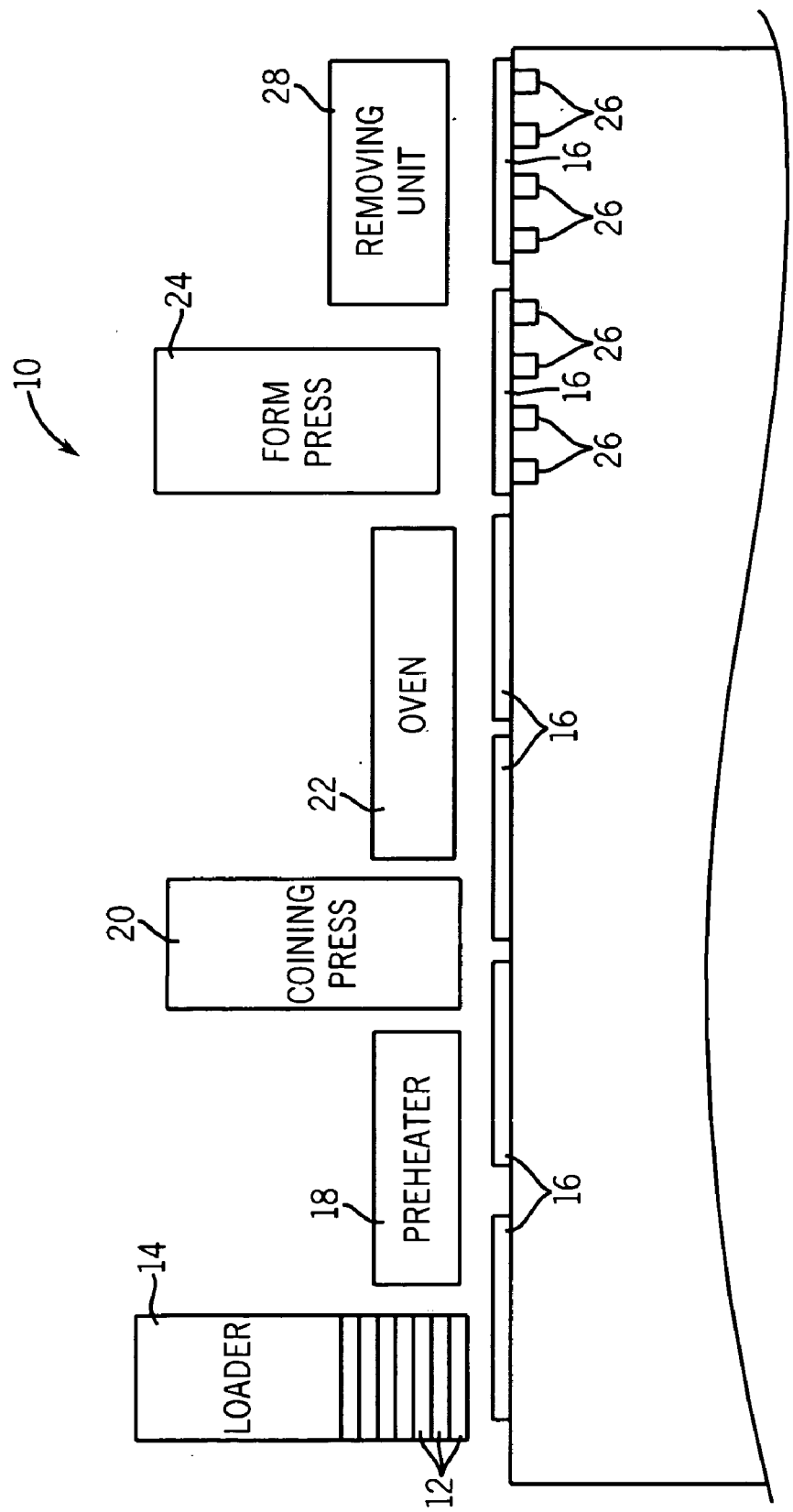
FIG. 1 is a schematic illustration of a thermoforming machine.

Referring to FIG. 1, a thermoforming machine, shown as thermoformer 10, includes several stages configured to transform input thermoplastic materials into formed containers. In the scrapless thermoforming embodiment shown in FIGS. 1–6, the input materials are thermoplastic blanks, shown as billets 12.

A loading station, shown as loader 14, is configured to load billets 12 onto a conveyor, having a conveying mechanism, shown as transport tray 16, for movement through the stations of thermoformer 10.

In an exemplary embodiment, a preheating station, shown as pre-heater 18, may be utilized to perform initial heating of the billets 12. Such initial heating may be desired when a coining press 20 is utilized to create an initial structure on the billet 12, such as adding a rim around the peripheral edge of billet 12. The pre-heater 18 may be suitable to heat billet 12 to a temperature permitting solid-phase thermoforming in the coining press 20.

After exiting the coining press 20, if utilized, the transport tray 16 is shuttled through a heating apparatus, shown as oven 22. The oven 22 heats the billets 12 to the desired temperature prior to entry into a thermoforming press, shown as forming station or form press 24. The desired temperature is dependent on the thermoplastic material used. In a preferred embodiment, solid-phase thermoforming is performed at a temperature below the crystalline melt temperature of billet 12.

Form press 24 is known in the art and may be any one of a number of types available from a number of known suppliers. Form press 24 is used to form thermoplastic containers 26 from individual billets 12. Form press 24 permits the forming of different shaped containers 26 through the utilization of different tooling having the desired resultant configuration. The tooling typically includes a forming plug 54 (see FIG. 6) that is lowered into the heated billet 12, pushing the billet 12 down into a form cavity 52 (see FIG. 6) that is of the final container shape. Air pressure and/or vacuum assist may be used to aid in pulling or pushing the billet 12 into the form cavity 52, and the form cavity 52 may be cooled with chilled water to permit easier release of the formed container 26.

After exiting the form press 24, transport tray 16 conveys formed containers 26 to an unloading station or removing unit 28 that removes the formed containers 26 from the transport tray 16 such that transport tray 16 may be recycled to the start of thermoformer 10 for use in conveying more billets 12.

Figure 2:
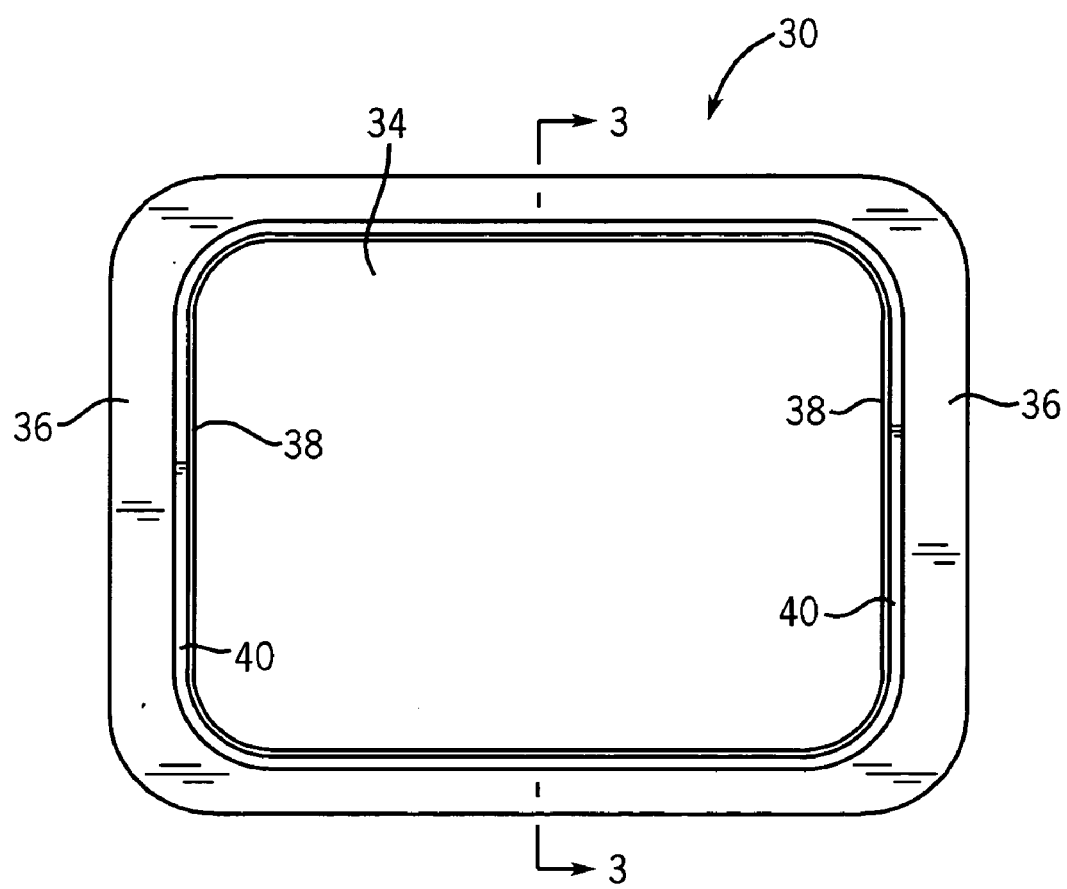
FIG. 2 is a top view of a frame without a billet.

Referring to FIGS. 1 and 2, in an exemplary embodiment, transport tray 16 supports a number of rings or frames 30, each configured to support a billet 12 (not shown in FIG. 2). Billets 12 may be substantially rectangular to be received in the frame 30 of FIG. 2, but may take other shapes and sizes. The dimensions of transport tray 16 may vary depending on the size of thermoformer 10. Further, the number of frames 30 disposed on transport tray 16 is variable, depending on the desired size and shape of formed containers 26, as well as the configuration of thermoformer 10 and form press 24. Transport tray 16 may be constructed of aluminum, steel, or other materials suitable for use in thermoformer 10. Frames 30 are attached to transport tray 16 using any of a variety of suitable attachment mechanisms, such as screws or bolts.

Further referring to FIG. 1, transport tray 16 may be conveyed through thermoformer 10 by a chain drive (not shown). Thermoformer 10 may be configured to release transport tray 16 at various points in thermoformer 10 where transport tray 16 must remain stationary, such as when in form press 24.

In the exemplary embodiment depicted in FIGS. 2–6, the frame 30 is configured to support one billet 12. Billet 12 is supported at an interface between the billet 12 and frame 30. Although the frame 30 depicted in FIG. 2 is rectangular, frame 30 may be of any desired shape or size.

Referring to FIGS. 2–6, frame 30 includes an outer ring or perimeter portion 36 and a center cavity 34. The billet 12 is supported by a billet support, shown as, but not limited to, blade 38. Blade 38 and perimeter portion 36 define a trough or channel 40. As shown in FIG. 3, billet 12 includes an outer edge or edge portion 42 that overhangs channel 40. Center portion 44 of billet 12 is disposed over center cavity 34.

Frame 30 and blade 38 may be made of steel, aluminum, or other materials suitable for use in thermoformer 10. In a preferred embodiment, blade 38 is narrow, such as 0.05 inches across in a frame 30 having a cavity 34 dimensions of 8.5 inches by 6.5 inches. FIG. 3 depicts the relationship between billet 12 and blade 38 prior to heating of billet 12. Edge portion 42 does not extend downward into channel 40 when billet 12 is cool, as typical thermoplastic materials are relatively stiff prior to heating.

Referring to FIG. 4, coining press 20 (see FIG. 1) may be used to pre-form billet 12 such that edge portion 42 extends downward into channel 40 prior to entry into oven 22 for further heating.

The utilization of coining press 20 to pre-form edge portion 42, as shown in FIG. 4, aids in the retention of billet 12 on frame 30 as billet 12 is heated in oven 22. Further, the pre-forming of edge portion 42 may be desirable to provide a lip on formed container 26. Pre-heater 18 and coining press 20 are not essential elements of the invention, but are part of one embodiment thereof.

Referring to FIG. 5, in an exemplary embodiment, as billet 12 is heated to the desired temperature for thermoforming, edge portion 42 and center portion 44 may begin to lose rigidity and expand. The heating may result in billet 12 bulging upward due to the expansion or assuming the orientation depicted in FIG. 5, or some combination thereof, depending on the material and temperature of billet 12. Rather than sliding off or losing engagement with frame 30, the billet 12 remains on frame 30 due to engagement with blade 38.

In thermoformers 10 having an oven 22 that heats both sides of billet 12 simultaneously, frame 30 may partially shield edge portion 42 from heating in the oven (by shielding edge portion 42 from bottom element of oven 22) thereby reducing the temperature of edge portion 42 relative to center portion 44. The resulting temperature differential may result in increased stiffness of edge portion 42, aiding in retaining billet 12 on frame 30. However, in embodiments where frame 30 does not shield edge portion 42 (e.g., oven 22 having only top-heating), the blade 38 retains billet 12 on frame 30 via frictional engagement.

The combination of blade 38 and channel 40 permits positive retention of billet 12 where a shelf structure fails to do so. A shelf without channel 40 does not permit the sagging of edge portion 42, as depicted in FIG. 5, which aids in retaining billet on frame 30. Further, the narrow dimension of blade 38 in the preferred embodiment permits superior frictional engagement of billet 12 compared to wider structures. Although blade 38 is shown as a continuous wall of material in FIG. 2, the blade 38 may also take other forms, such as a segmented wall or series of posts that perform the engagement and support function suitable to retain billet 12 during heating.

Figure 6:
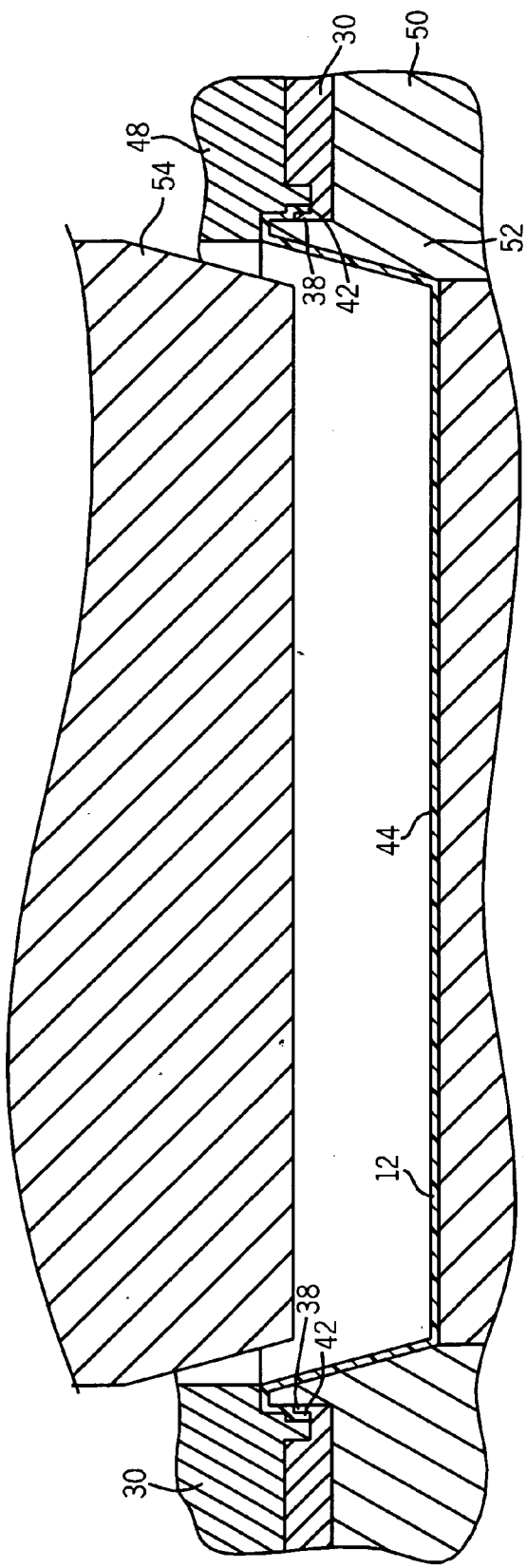
FIG. 6 is a partial sectional view of a form press.

Referring to FIG. 6, within form press 24, upper clamp 48 and lower holder 50 come together and engage frame 30 prior to forming container 26. Center portion 44 and edge portion 42 of billet 12 may be simultaneously formed within form press 24 through the use of upper clamp 48, lower holder 50, form cavity 52, and forming plug 54. In a preferred embodiment, billet 12 is heated to a temperature lower than the crystalline melting temperature of billet 12, such that solid-phase forming is performed within form press 24. In other embodiments, billet 12 may be heated to different temperatures, for example to a temperature at or above the melting point of billet 12 to support melt-phase thermoforming.

The use of blade 38 in conjunction with channel 40 permits greater flexibility in a thermoforming process utilizing billets 12. Because blade 38 provides a superior grip on billet 12, larger billets 12 may be heated and formed than previously possible, as larger billets 12 are subject to greater deformation when heated, and accordingly are not properly retained by conventional devices used to hold billets 12. Further, the present invention permits the thermoforming of billets 12 having various non-uniform shapes and sizes that are problematic in conventional holding devices due to the non-uniform expansion and resulting stresses when heated. Further still, the structure of the present invention obviates the necessity of providing a support structure over billet 12 in certain cases, reducing the complexity and associated cost of manufacturing formed containers 26.

While the detailed drawings and specific examples given describe various exemplary embodiments, they serve the purpose of illustration only. It is to be understood that the invention is not limited in its application to the details of construction and the arrangements of components set forth in the preceding description or illustrated in the drawings. Furthermore, other substitutions, modifications, changes, and omissions may be made in the design, operating conditions, and arrangements of the exemplary embodiments without departing from the scope of the invention as expressed in the appended claims.

What is claimed is:

1. A thermoforming machine, comprising:
   a loading station configured to load a thermoplastic billet onto a frame with an outer ring and a billet support blade defining a channel therebetween, the billet support blade engaging the billet to maintain the billet on the frame during heating of the billet;
   a heating apparatus configured to heat the billet; and
   a forming station configured to form the billet into a container;
   wherein the billet support blade defines a perimeter of an opening in the frame and wherein there is no support structure for the billet either above the blade or below the opening during heating of the billet in the heating apparatus.

2. The thermoforming machine of claim 1, further comprising a coining press for driving a portion of the billet into the channel.

3. The thermoforming machine of claim 2, further comprising a pre-heater.

4. The thermoforming machine of claim 1, further comprising an unloading station.

5. The thermoforming machine of claim 1, wherein the billet support blade is constructed of a continuous segment of material.

6. The thermoforming machine of claim 1, wherein the billet support blade is narrower than the channel.

7. The thermoforming machine of claim 1, wherein the frame is coupled to a transport tray.

8. A frame for transporting a billet in a thermoformer, comprising:
   an outer ring defining a non-circular center cavity; and
   a blade extending around the center cavity inside of the outer ring, defining a channel extending between the blade and the outer ring, the blade configured to support a thermoplastic billet, wherein the frame does not include a ring or a clamp configured to engage an upper side of the billet, wherein the channel is of sufficient width to receive a portion of the thermoplastic billet.

9. The thermoforming machine of claim 8, wherein the frame is configured for attachment to a transport tray.

10. The thermoforming machine of claim 8, wherein the blade is a continuous metal wall.

11. The thermoforming machine of claim 8, wherein the blade is narrower than the channel.

12. A thermoforming machine, comprising:
   a loading station configured to load a plastic billet onto a conveying mechanism, the conveying mechanism having a frame with an outer ring and a billet support, the billet support having means for frictionally gripping the billet, the billet forming an arch over the gripping means when heated, wherein the means for frictionally gripping the billet does not extend above the billet;
   a heating apparatus configured to heat the billet; and
   a forming station configured to form the billet into a container.

13. The thermoforming machine of claim 12, further comprising a coining press for pushing a portion of the billet into the channel.

14. The thermoforming machine of claim 13, further comprising a pre-heater.

15. The thermoforming machine of claim 12, further comprising an unloading unit.

16. The thermoforming machine of claim 12, wherein the billet support blade is a continuous metal wall.

* * * * *